United States Patent [19]

Anderson et al.

[11] Patent Number: 5,297,815
[45] Date of Patent: Mar. 29, 1994

[54] SECURITY PRINTED DOCUMENTS

[75] Inventors: Mark J. Anderson, Seaham; Arnold Roseberry, Sunderland, both of Great Britain

[73] Assignee: Moore Business Forms, Inc., Grand Island, N.Y.

[21] Appl. No.: 926,692

[22] Filed: Aug. 10, 1992

[30] Foreign Application Priority Data

Dec. 7, 1991 [GB] United Kingdom ............... 9126132

[51] Int. Cl.⁵ .............................................. B42D 15/00
[52] U.S. Cl. ...................................... 283/93; 283/902
[58] Field of Search ..................... 283/93, 94, 95, 902

[56] References Cited

U.S. PATENT DOCUMENTS

| 4,780,397 | 10/1988 | Tsuchiya | 430/394 |
| 5,149,140 | 9/1992 | Mowry, Jr. et al. | 283/93 |
| 5,197,765 | 3/1993 | Mowry, Jr. et al. | 283/93 |

FOREIGN PATENT DOCUMENTS 3419859 1/1985 Fed. Rep. of Germany .
WO91/1113-31 8/1991 PCT Int'l Appl. .

*Primary Examiner*—Paul A. Bell
*Attorney, Agent, or Firm*—Nixon & Vanderhye

[57] ABSTRACT

A security document that provides an indication it is a copy when copied by a photocopy machine has printed background pattern and warning printer matter interspersed with blank areas of a substrate to provide a distinct intermeshed pattern so that the warning printed matter is indistinguishable from the printed background by the human eye. The printed background comprises a number of parallel lines of a size such that they will be resolved by a photocopy machine, while the warning printed matter comprises geometric elements (typically circular dots) of a size less than that which can be resolved by a photocopy machine. The dots are disposed in a geometric continuation of at least some of the lines from the printed background, and are configured to form invalidating indicia of the document is copied by a photocopy machine. The printed background pattern and warning printed matter typically have a density of less than 20%, such as about 7-11%. The warning printed matter may be in the form of at least one outline letter configuration, in which case second lines, making an angle of about 20-70% with respect to the first lines, are provided within the outline letter configuration.

21 Claims, 2 Drawing Sheets

SECURITY PRINTED DOCUMENTS

BACKGROUND AND SUMMARY OF THE INVENTION

There are numerous prior art patents and commercial products relating to security documents that have different types of printing on them. One type of printing can be resolved by conventional photocopy machines (such as xerographic copiers), while the other printing cannot be resolved by conventional photocopy machines and, therefore "disappears" if the document is copied. By providing the disappearing printed matter in a particular configuration that provides a warning indicia (such as the words "VOID"), a clear indication will be provided on the copied document that it is not an appropriate document and, therefore, hopefully will not be able to be used for illegal purposes. Security documents to which these techniques are applied typically are bank checks, titles to real and personal property, and the like.

While prior art security documents have been successful in preventing accurate nefarious production under many circumstances, some prior art security documents having this capability look somewhat unusual to many users. On some such documents, the warning indicia are not effectively hidden, which can make a legitimate document subject to question, while on other such documents the warning indicia are provided on only a small part of the document, or in an unusual and un-esthetically dense pattern.

According to the present invention, a security document is provided that has the same utility as prior art security documents in providing a warning indicia if copied by conventional photocopy machines, but the configuration of the printed matter is such that it is more pleasing esthetically than many conventional security documents, does not have inordinately dense printed areas, and in general has an interspersing of blank areas with printed areas in a distinct continuous intermeshed pattern such that the warning printed matter is indistinguishable from the printed background by the human eye.

According to one aspect of the present invention, a security document that, if copied by a photocopy machine, provides an indication that it has been copied comprises the following elements. A substrate having a surface receiving printing. A first plurality of printed elements visible to the human eye as lines extending in a first direction parallel to each other, and dimensioned so that they can be resolved by a photocopy machine. A second plurality of printed elements visible to the human eye as lines extending in the first direction and parallel to each other, and appearing to the human eye as continuations of the first plurality of printed elements, and dimensioned so that they cannot be resolved by a photocopy machine, the second plurality of elements disposed in a configuration forming invalidating indicia if the document is copied by a photocopy machine. The printed elements have a density of less than 20%, and the printed elements are disposed in a pattern that is continuous over the majority of the surface, interspersed with blank areas of the surface, so that the elements collectively establish a pattern that is seen by the human eye as a continuous pattern in which the invalidating indicia are not visible unless the document is copied by a photocopy machine. Typically, the first printed elements are lines and the second printed elements are dots.

Normally the substrate has a quadrate configuration including two end edges and two side edges, and the first lines are preferably parallel to two of the edges of the substrate. To provide an appropriate density some of the dots may be disposed in additional in-line configurations parallel to the geometric continuations of some of the first lines, and disposed equidistant between two of the geometric continuations.

The techniques according to the present invention are particularly applicable for utilization when the warning printed matter is disposed in the form of at least one outline letter configuration, and normally in a plurality of outline letter configurations such as the letters making up the word "VOID". An outline letter configuration per se is described in U.S. Pat. No. 4,420,175, the disclosure of which is hereby incorporated by reference herein. According to the present invention, when an outline letter configuration is provided for the first warning printed matter, a second printed background pattern is disposed on the surface within the outline letter configuration, and comprises a plurality of second parallel lines extending in a third direction, the second lines of a size such that they will be resolved by a photocopying machine. This third direction makes an angle of between 20–70° (e.g., 45°) with respect to an edge of the substrate. For certain letter configurations (such as the "O" and "D" in the word "VOID"), second warning printed matter dots in a repeat form of the same outline letter are disposed inside of the second parallel lines forming a continuation of some of the second parallel lines, and a third printed background pattern may be provided on the surface disposed within the second dots outline configuration and providing lines which are a geometric continuation of the first lines.

The density of the various printed portions will be varied depending upon the color, particular pattern (e.g., herringbone) of the printed matter, and the like, but typically are within the range of about 7–15%, e.g., 7–11%, and more particularly about 9–11% for the background printed matter. The dots, which may be circular, have an average maximum cross dimension of no more than 0.0076 cms (three thousandths of an inch) so that they do not reproduce accurately. The lines — since they have a significant length — may have a width that is about 0.0076 cms, and will reproduce.

It is a primary object of the invention to provide a simple yet effective security document that in its normal configuration presents a distinct continuous intermeshed pattern in which warning printed matter is indistinguishable from the background printed matter by the human eye, yet when copied by a photocopy machine provides clear warning indicia. This and other objects of the invention will become clear from an inspection of the detailed description of the invention and from the appended claims.

DETAILED DESCRIPTION OF THE DRAWINGS

Figure 1:
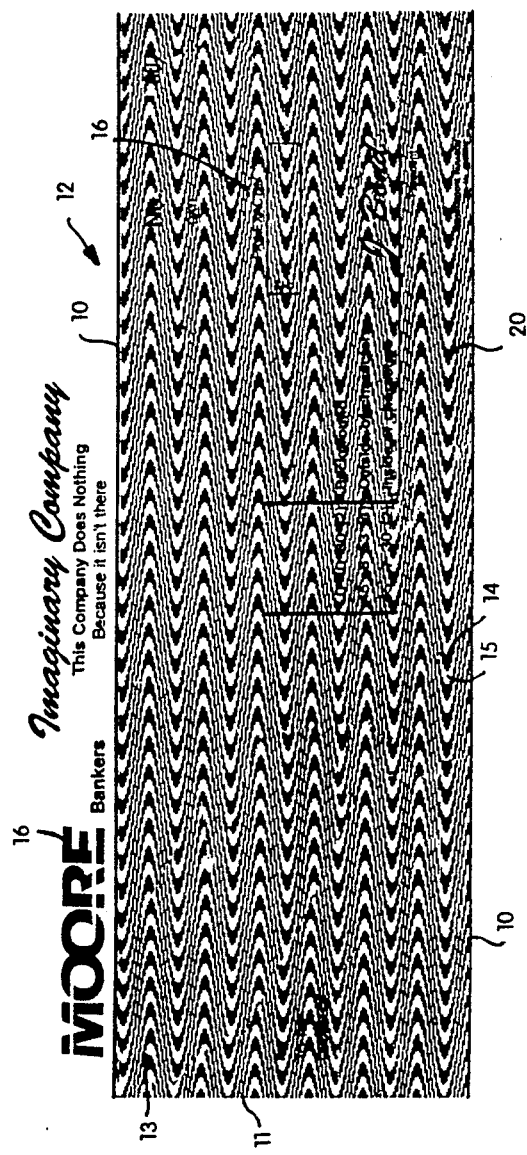
FIG. 1 is a plan view of an exemplary security document (in the form of a bank check) according to the present.

A security document according to the present invention, shown generally by reference numeral 12 in FIG. 1 as a bank check which is quadrate (rectangular) in configuration and includes two end edges 10 and side edges 11, is defined by a substrate (such as paper) having a surface 13 which can be printed. A drawing of the type used in patent applications cannot really accurately reproduce the effect provided by a security document according to the invention; therefore, attached as an appendix hereto and comprising a part of this patent application is an actual security document produced according to this invention simulated in FIG. 1.

The document 12 has printed on the surface 13 thereof a regular pattern printed as a background over a majority of its surface area The background is printed in half tone with a density (printed area as a percentage of blank area) less than 20%, preferably in the range of about 7 to 15%, e.g., 7–11%, or 9–11%. The background is preferably printed in a single color but may be multicolored, and the document 12 may have printed indicia 16 printed in full tone, some over the background, to give such information as the name of the bank, the check number, and instructions for completing the check.

The pattern, when viewed by the human eye without detailed examination, appears to be a unitary herringbone pattern of wavy printed areas 14 interspersed by wavy blank areas 15.

The printing comprises a first pattern of background printing formed by a plurality of short horizontal parallel lines 20 (see FIG. 3) having a density, e.g., of about 10% and a spacing (pitch) of 30 lines per centimeter and a line thickness of about 0.0076 cms. First warning printed matter may comprise a series of dots 21 of, e.g., about 8% density, at least some of which are arranged in lines at a pitch 53 lines per centimeter, the lines comprising a geometric continuation of the lines 20. The dot diameter is about 0.0076 cms. Second background printed matter comprises a series of parallel lines 22 printed at, e.g., 7% density with a pitch of 30 lines per centimeter and at an angle of between 20° and 70° (e.g., about 45°) with respect to edges 10 or 11.

The first warning printed matter forms the letters of the word VOID repeated several times across the background and making hollow outline configurations of each of the letters V,O,I and D. The second background printed matter 22 is located immediately inside the first warning printed matter 21 so that it also spells out the word VOID. In the case of the letters O and D a further small hollow outline of the letters is formed within the second background printed matter by further dots 23 of a second warning printed matter, which is a continuation of at least some of lines 22; and the centers of the hollow letters formed by dots 23 contain the third background pattern printing lines 20, which are continuations of lines 20.

Figure 3:
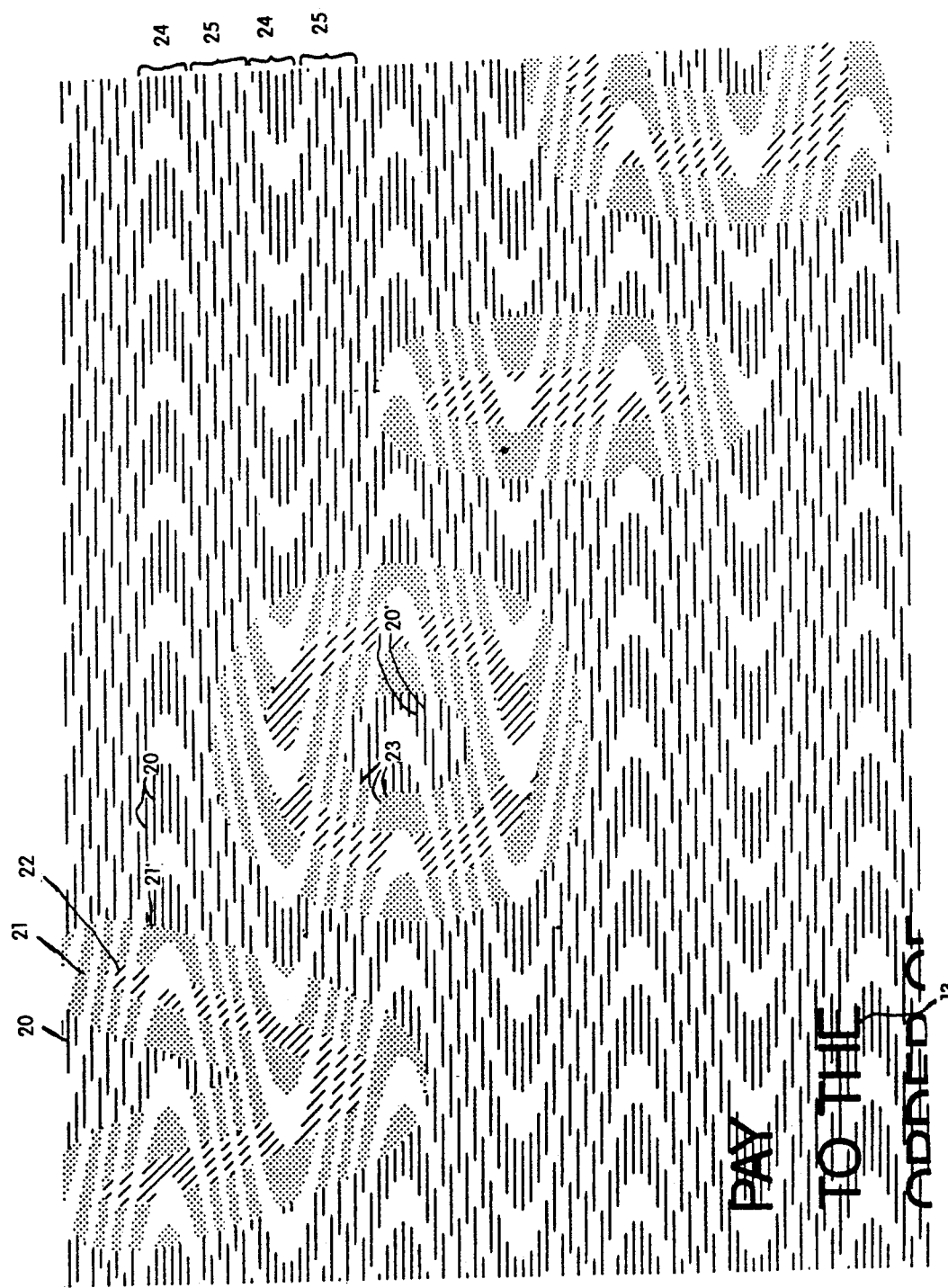
FIG. 3 is a greatly enlarged view of a portion of the document of FIG. 1 showing the details of the elements thereof.

Note that the dots 21 are preferably provided in twice as many in-line configurations as the lines 20, in order to have approximately the same (although it may be slightly less) density as the lines 20. In this regard an in-line configuration of dots 21' (as seen in FIG. 3) may be provided intermediate geometric configurations of the dots 21 that are continuations of two of the lines 20.

Figure 2:
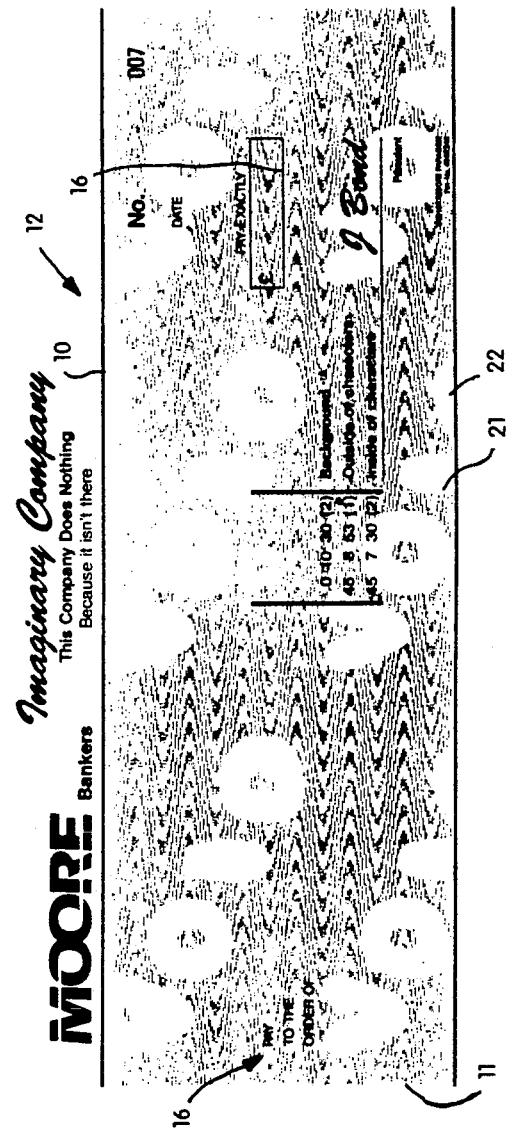
FIG. 2 is a plan view of the document of FIG. 1 after it has been photocopied, providing warning indicia.

When the document 12 is photocopied, as seen in FIG. 2, since the size of the dots 21, 23 is below the threshold copying capability of the photocopier, the dots 21, 23 drop out so that the words VOID become clearly visible. If the copying is carried out parallel to the lines 20, the lines 22 (arranged at 20–70° to edges 10 or 11) are relatively enhanced because of directional slur, so that the word "VOID" becomes even more visible. In general, the printed background pattern formed by lines 20, 22, 20' and the warning printed matter formed by dots 21, 21', 23, are interspersed with blank areas of the surface 13 in a distinct continuous intermeshed pattern so that the warning printed matter formed by the dots 21, 21', 23 is indistinguishable from the printed background by the human eye, and there are no dense or unusual areas provided on the surface 13, but rather merely the continuous pattern.

It will thus be seen that according to the present invention an effective yet esthetically pleasing security document has been provided While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structure and devices.

What is claimed is:

1. A security document that if copied by a photocopy machine, provides an indication that it has been copied comprising:

a substrate having a surface receiving printing;

a first plurality of printed elements visible to the human eye as lines extending in a first direction parallel to each other, and dimensioned so that they can be resolved by a photocopy machine;

a second plurality of printed elements visible to the human eye as lines extending in said first direction and parallel to each other, and appearing to the human eye as continuations of said first plurality of printed elements, and dimensioned so that they cannot be resolved by a photocopy machine, said second plurality of elements disposed in a configuration forming invalidating indicia if said document is copied by a photocopy machine;

said printed elements having a density of less than 20%; and said printed elements disposed in a pattern that is continuous over the majority of said surface, interspersed with blank areas of said surface, so that said elements collectively establish a pattern that is seen by the human eye as a continuous pattern in which said invalidating indicia are not visible unless said document is copied by a photocopy machine.

2. A security document as recited in claim 1 wherein said first printed elements are lines, and said second printed elements are generally circularly shaped dots.

3. A security document as recited in claim 1 wherein said printed elements have a density of about 7–11%.

4. A security document as recited in claim 1 wherein said second printed elements are in the form of at least one outline letter configuration; and further comprising a third plurality of printed elements of a size that can be resolved by a photocopy machine disposed within said outline letter configuration, and distinct in shape or orientation from said first printed elements.

5. A security document as recited in claim 1 wherein the density of the second printed elements is less than the density of the first printed elements.

6. A security document that, if copied by a photocopy machine provides an indication that it has been copied comprising:
  a substrate having a quadrate configuration including two end edges and two side edges, and a surface;
  a first printed background pattern on said surface and covering the vast majority of said surface, comprising a plurality of first parallel lines extending in a first direction and spaced from each other in a second direction, transverse to said first direction, a first spacing; and having a first width, and a length longer than said first width, said lines a size such that they will be resolved by a photocopy machine;
  first warning printed matter comprising a plurality of dots of predetermined size, said size being less than the size that can be resolved by a photocopy machine; at least some of said dots disposed in a geometric continuation of at least some of said first parallel lines; and said first warning printed matter being configured to form invalidating indicia if said document is copied by a photocopy machine;
  said printed background pattern and warning printed matter having a density of less than 20%; and
  said printed background pattern and warning printed matter interspersed with blank areas of said surface in a distinct continuous intermeshed pattern so that said first warning printed matter is indistinguishable from said printed background by the human eye.

7. A security document as recited in claim 6 wherein said first lines are parallel to two edges of said substrate.

8. A security document as recited in claim 7 wherein some of said dots are disposed in a additional, in-line configurations parallel to said geometric continuation of some of said first lines, and disposed equidistant between two of said geometric continuations.

9. A security document as recited in claim 7 wherein said first warning printed matter is in the form of at least one outline letter configuration; and further comprising a second printed background pattern on said surface, disposed within said outline letter configuration, comprising a plurality of second parallel lines extending in a third direction and spaced from each other in a fourth direction, transverse to said third direction, a second spacing; and having a second width, and a length longer than said second width, said second width of a size such that the second lines will be resolved by a photocopy machine.

10. A security document as recited in claim 9 wherein said third direction makes an angle of between 20–70° with respect to an edge of said substrate.

11. A security document as recited in claim 6 further comprising second warning printed matter comprising a second plurality of dots of predetermined size, said size being less than the size that may be resolved by a photocopy machine, at least some of said second plurality of dots disposed in a geometric continuation of at least some of said second parallel lines, and said second warning printed matter being disposed within the letter outline configuration of said first warning printed matter.

12. A security document as recited in claim 11 wherein said second warning printed matter dots are also in the form of said at least one outline letter configuration, and further comprising a third printed background pattern on said surface, disposed within said outline configuration of said second warning printed matter, comprising a plurality of third parallel lines, said third lines being aligned with said first parallel lines, forming geometric continuations of some of said first parallel lines.

13. A security document as recited in claim 9 wherein said first and second widths and spacings are approximately equal.

14. A security document as recited in claim 6 wherein some of said dots are disposed in additional in-line configurations parallel to said geometric continuation of some of said first lines, and disposed equidistant between two of said geometric continuations.

15. A security document as recited in claim 6 wherein said background printed matter has a density of about 9–11%.

16. A security document as recited in claim 6 wherein said background printed matter and warning printed matter are in a herringbone pattern.

17. A security document as recited in claim 6 wherein said dots have an average maximum cross dimension of no more than 0.0076 cms.

18. A security document as recited in claim 17 wherein said dots are circular in configuration.

19. A security document as recited in claim 6 wherein said first width is about 0.0076 cms.

20. A security document as recited in claim 6 wherein said first warning printed matter is in the form of at least one outline letter configuration; and further comprising a second printed background pattern on said surface, disposed within said outline letter configuration, comprising a plurality of second parallel lines extending in a third direction and spaced from each other in a fourth direction, transverse to said third direction, a second spacing; and having a second width, and a length longer than said second width said second width of a size such that the second lines will be resolved by a photocopy machine.

21. A security document as recited in claim 20 further comprising second warning printed matter comprising a second plurality of dots of predetermined size, said size being less than the size that may be resolved by a photocopy machine, at least some of said second plurality of dots disposed in a geometric continuation of at least some of said second parallel lines, and said second warning printed matter being disposed within the letter outline configuration of said first warning printed matter.

* * * * *